United States Patent
Jannasch et al.

(10) Patent No.: US 7,513,736 B2
(45) Date of Patent: Apr. 7, 2009

(54) EQUIPMENT FOR THE AERATION OF A ROTOR HUB OF A WIND ENERGY PLANT

(75) Inventors: Henrik Jannasch, Rostock (DE); Uwe Kroh, Rostock (DE)

(73) Assignee: Nordex Energy GmbH, Norderstedt (DE)

( * ) Notice: Subject to any disclaimer, the term of this patent is extended or adjusted under 35 U.S.C. 154(b) by 0 days.

(21) Appl. No.: 11/282,555

(22) Filed: Nov. 18, 2005

(65) Prior Publication Data
US 2006/0120862 A1    Jun. 8, 2006

(30) Foreign Application Priority Data
Dec. 7, 2004   (DE) .................. 10 2004 058 776

(51) Int. Cl.
*F01D 25/26* (2006.01)
(52) U.S. Cl. ............................ 415/108; 415/175
(58) Field of Classification Search .............. 415/108, 415/116, 144, 175, 176
See application file for complete search history.

(56) References Cited

U.S. PATENT DOCUMENTS

| 4,863,354 A * | 9/1989 | Asselin et al. .......... 416/245 R |
| 6,285,090 B1 * | 9/2001 | Brutsaert et al. .............. 290/55 |
| 2004/0160063 A1 | 8/2004 | Le Nabour et al. ............ 290/55 |

FOREIGN PATENT DOCUMENTS

| EP | 1 375 913 A1 | 6/2003 |
| GB | 2160924 A * | 1/1986 |

OTHER PUBLICATIONS

Abstract of Japanese Pat. No. 58065977 A, published Apr. 19, 1983.

* cited by examiner

*Primary Examiner*—Edward Look
*Assistant Examiner*—Dwayne J White
(74) *Attorney, Agent, or Firm*—Vidas, Arrett & Steinkraus, P.A.

(57) ABSTRACT

Wind energy plant with an aeration equipment for a rotor hub, with a cup-shaped element which has a bottom and a circumferential side wall, and a pipe-shaped connection piece, directed into an inner space of the rotor hub, the cup-shaped element being kept in front of an entrance opening of the connection piece such that the entrance opening is arranged in the interior of the cup-shaped element.

7 Claims, 3 Drawing Sheets

EQUIPMENT FOR THE AERATION OF A ROTOR HUB OF A WIND ENERGY PLANT

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to an equipment for the aeration of a rotor hub of a wind energy plant.

In modern wind energy plants, the power that is taken up from the wind by the rotor is limited by the pitch angle of the rotor wings, and is often controlled in its value thereby. The installations for changing the pitch angle, which are necessary to do this, thus in particular servomotors, control unit, energy storage element and so on, are often situated in the hub. These equipments, as well as other components in the hub, have to be protected as well as possible against disadvantageous influences from the environment.

Depending on environmental and operation conditions, at operation in very hot regions for instance, enhanced cooling of certain component parts of the pitch system is necessary, also at strong load in particular.

From patent abstracts of Japan 58065977 A it is known to provide an outlet opening on the outer side of the gondola in the region of the transition from the gondola to the rotor hub. The outlet opening has an inlet channel which is angled off in an U-shaped fashion.

The present invention is based on the objective to provide an aeration equipment of a rotor hub in a wind energy plant, which ensures sufficient aeration on the one hand, and prevents intrusion of water, dust and the like on the other hand. According to the invention, the objective is resolved by an energy plant with the features of patent claim 1. Advantageous forms of realisation are the subject matter of the subclaims.

BRIEF SUMMARY OF THE INVENTION

The objective according to the invention is resolved by a wind energy plant with an aeration equipment of the rotor hub, the aeration having a cup-shaped element and a pipe-shaped connection piece. The cup-shaped element has a bottom and a circumferential side wall. The pipe-shaped connection piece is directed into an inner space of the rotor hub. The cup-shaped element is kept in front of an entrance opening of the connection piece, such that the entrance opening is laterally protected by the side wall. Through this it is achieved that the entering air flow must enter the inner space of the cup-shaped element by passing along the side wall thereof, and that it reaches the inner space of the rotor hub by reversing its direction of movement. Reversing the direction of movement several times ensures that any particles or liquid, which are carried along with the air, do not reach the inner space of the rotor hub. Preferably, the connection piece is essentially arranged on the rotational axis of the hub. Through this it is ensured that the air flow entering through the connection piece is directed directly onto the hub on the one hand. On the other hand, this positioning ensures also that an impact pressure that is formed before the rotor hub directs the blowing air across the cup-shaped element into the interior of the same and from there via the connection piece into the rotor hub with sufficient pressure. The aeration equipment according to the invention also allows for a pressure compensation in the wing, during the passage of the tower in the rotation of the rotor wings. Through this, the pump effect occurring on the wings can be compensated and the load of the wing material can be further reduced.

Preferably, the cross section of the entrance opening into the connection piece increases, the wall of the connection piece being inclined towards the outside for this purpose. Just in that case in which the connection piece is arranged in the extension of the rotational axis, the wall of the connection piece rotates around the longitudinal axis thereof. Entering liquid or particles are moved away from the entrance opening by the centrifugal force when the wall is inclined towards the outside.

In a preferred form of realisation, the cup-shaped element has an inside diameter which is greater than the outside diameter of the connection piece. When the cup-shaped element and the connection piece are realised to be rotationally symmetrical, they can be arranged on the rotational axis of the rotor hub with their axis of symmetry, so that they also rotate around the rotational axis thereof when the wind energy plant is in operation.

In a preferred further development, a wall element is provided, which has a deepening with central opening, onto which the connection piece is set up or through which the connection piece extends through. Depending of the needs of aeration, the connection piece can be only mounted onto the opening of the connection piece, or it may extend through the wall element in order to direct the airflow deeper into the rotor hub.

In a possible form of realisation, the wall element is realised as being planar outside the deepening. In this form of realisation, the bottom of the cup-shaped element is preferably at equal height with the wall element. The cup-shaped element, kept in the deepening of the wall element, forms with its bottom essentially a plane with the wall element in this form of realisation.

Preferably, the wall element is swingably articulated to a frame via at least one arm. Preferably, the arm forms a hatch, which can be closed by the swingable wall element. Fixation means are preferably provided on the frame and/or the wall element for doing so, in order the close the central hatch.

In an alternative form of realisation, the edge of the wall element is bent off along a circumferential buckling line. In this form of realisation, the edge of the wall element is arranged to be spaced apart from a casing of the rotor hub, such that an outlet channel for the air from the interior of the rotor hub is formed. For this form of realisation, the connection piece extends into the inner space of the rotor hub, surpassing the wall element, in order to convey the air into the inner space of the rotor hub. Additionally, an elastic tube can be put on the end of the connection piece, through which air comes deeper into the interior of the rotor hub.

BRIEF DESCRIPTION OF SEVERAL VIEWS OF THE INVENTION

Two preferred examples of realisation are described in more detail by means of the figures below.

DETAILED DESCRIPTION OF THE INVENTION

Figure 1:
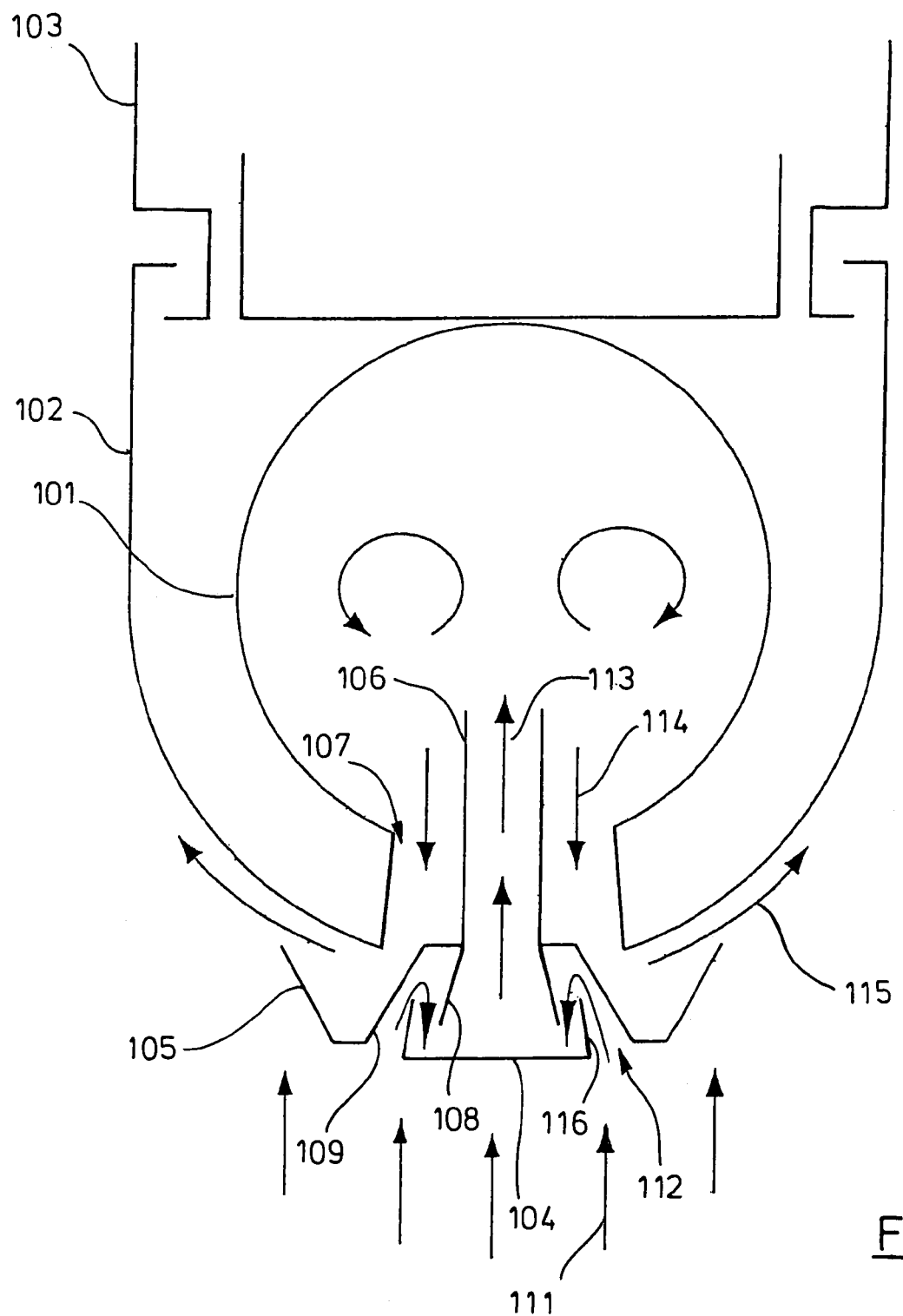
FIG. 1 shows a schematic cross sectional view of a rotor hub with casing.

While this invention may be embodied in many different forms, there are described in detail herein a specific preferred embodiment of the invention. This description is an exemplification of the principles of the invention and is not intended to limit the invention to the particular embodiment illustrated FIG. 1 shows, in a schematic view, a rotor hub 101, which is surrounded by a casing 102. The casing is designated as spinner in the following. Rotor hub 101 and spinner 102 rotate with respect to the gondola 103.

The aeration of the hub takes place from the front side, i.e. from that direction from which the air flows. The aeration has a cup-shaped closing 104, which is arranged before an entrance opening into the connection piece 108. Via a bottom element 105, the connection piece 108 extends into the interior of the rotor hub.

The air mass which is jammed before the rotor hub, indicated by the flow arrow 111, enters the cap 104 along the flow channel 112 and flows further from here into the interior of the rotor hub 101 via the air channel 106, as is indicated by the airflow 113. In the interior of the rotor hub, the airflow is swirled and leaves again via a further air channel 107 between wall element 105 and spinner 102, as is indicated by the flow arrow 114, compare airflow 115. This effect is supported by the air flowing asides to the hub, which develops a suction effect in the region of the outlet opening for the airflow 115, and thus increases the throughput of air. The air channels 106 and 107 are preferably realised such that they can be easily opened or moved aside, in order to enable entering the inner space of the rotor hub 101 from the inner space of the spinner 102.

In FIG. 1 it can be recognised the cross section area increases in the direction towards the entrance opening. Through this, the entrance of air into the inner space is facilitated. Additionally, humidity that might have entered is guided away from the entrance opening by the centrifugal force, as well as through the oblique part 109 of the bottom element. Also in FIG. 1, it can be recognised that the wall 116 of the cap 104 is inclined towards the inside, so that a wider entrance into the air channel is provided for the airflow 112.

Figure 2:
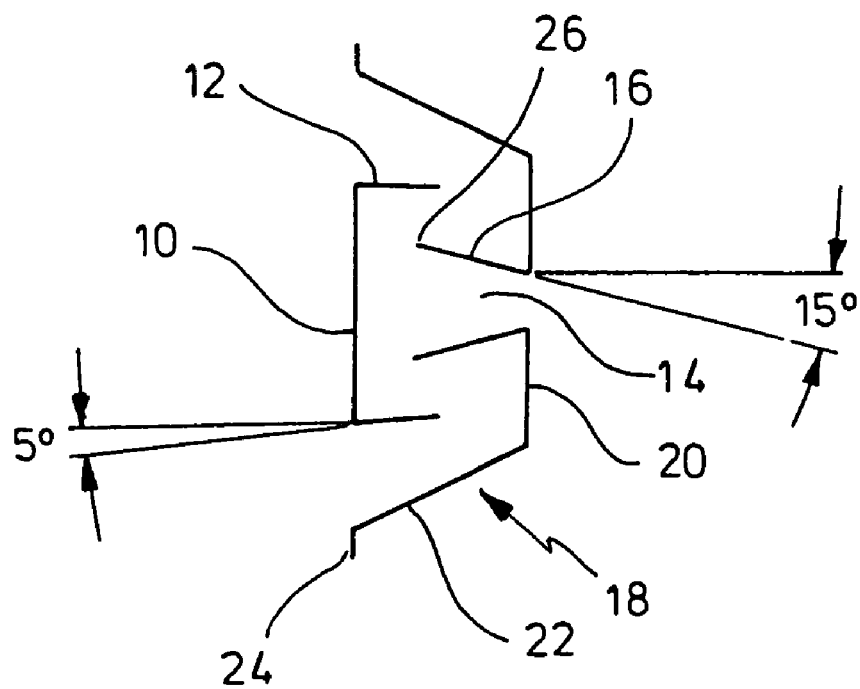
FIG. 2 shows a principle representation of the air entrance.

FIG. 2 shows the geometric configuration of the aeration system. The cup-shaped element has a circular form. The side wall 12 is inclined at about 5° towards the inside. The cup-shaped element 10 is arranged before an entrance opening 14 of a connection piece 16. The wall 16 of the connection piece is constantly opened towards the outside at an angle with respect to the central axis of about 15°, so that the connection piece 16 has the overall form of a truncated cone. The connection piece 16 is arranged in a wall element 18, which has a bottom element 20 in a deepening. The connection piece 16 stands centrally on the bottom 20 of the deepening. Adjacent to the bottom, side walls 22 are provided, which are also inclined with respect to the horizontal level. The side walls 22 verge into a region 24, which is represented in FIG. 2 only in its beginning.

As for the dimensioning of cap 10 and the deepening, a series of relations have proven to be particularly advantageous. It has proven to be particularly advantageous in the dimensioning to select the dimensions such that the airflow along the flow path has a cross section which remains substantially constant. Thus, the intrusion channel has substantially a constant cross section for the airflow. In the following, the distance between the side wall 12 of the cup and the side wall 22 in the region of the air entrance is defined as the quantity 1. The corresponding distance is drawn in FIG. 2. Departing from this reference quantity, it has proven to be advantageous that the side wall 22 has an incline, such that it has a width of 0,75 with respect to the plane running through the bottom 20 of the deepening. The distance between the free edge 26 of the connection piece 16 and the change-over from wall element to side wall 22 results then to be exactly twice the width of the side wall 22. In the example, the connection piece 16 has an opening angle of about 15°, the connection piece 16 decreasing in its diameter from 1,0 to 0,5. In the axial direction too, certain relations have proven to be particularly advantageous. The extent of the deepening in the axial direction is 1,5, the cover 10 immersing with about half depth. The connection piece 16 stands out for about one unit of length, so that an overlap of side wall 12 and connection piece 16 of 0,25 results.

Figure 3:
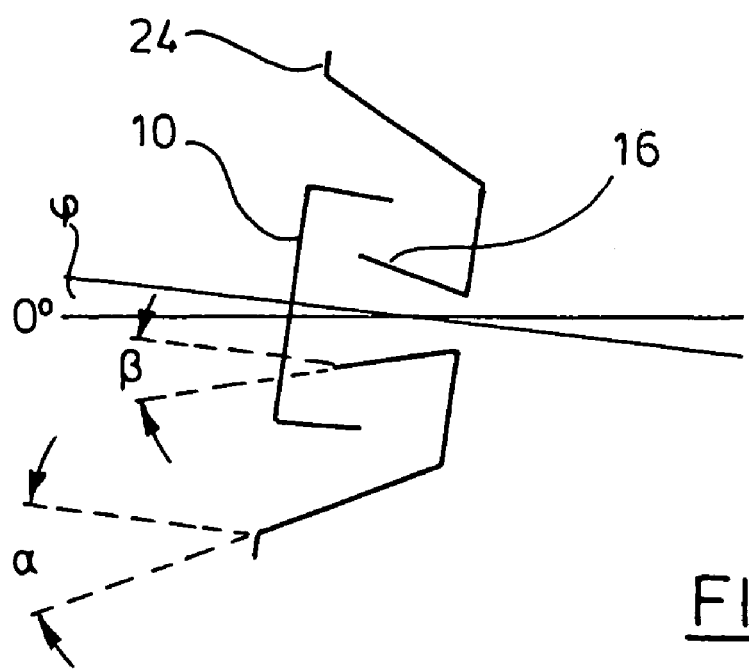
FIG. 3 shows the inclination of the connection piece with respect to the horizontal level.

FIG. 3 shows the inclination, also indicated as a tilt, with respect to the horizontal level. Because drive train and hub are often slightly inclined towards the backside in modern wind energy plants, the connection piece 16 and the cover 10 are tilted about the same angle $\phi$. The angle $\phi$ is mostly between 3° and 7°, and preferably a tilt angle of 5° is selected. Even at a tilt, the periphery of the opening is dimensioned such that water is rejected and it can flow off. The inclination of the connection piece 16 is indicated with the angle $\beta$ in FIG. 3, whereas the inclination of the side wall 22 was marked by the angle $\alpha$. In order to ensure draining off, there is: $\alpha > \phi$ and $\beta > \phi$.

Figure 4:
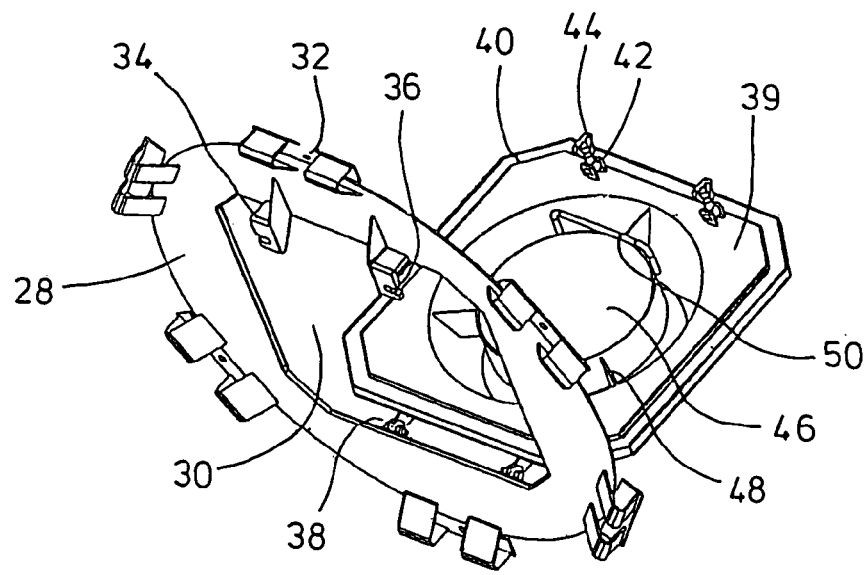
FIG. 4 shows a perspective view from the exterior of an entrance hatch with aeration opening.

FIG. 4 shows a perspective view of the aeration system according to the invention, which is integrated in an entrance hatch for the rotor hub. Normally, the entrance hatch is situated in the tip of the rotor hub or its housing, respectively. The entrance hatch has a wall plate 28 with a central opening 30 and fixation elements 32 along the perimeter. On the outer side of the wall plate 28, L-shaped locking overhangs 34 with a slit-shaped recess 36 are mounted. On corresponding overhangs 38, a hatch 39 with a frame 40 is swingably articulated. The hatch 39 opens towards the inside. The hatch frame 40 can be fixed in the recesses 36 by two projecting pins 42 with locking heads 44.

The cup 46 is provided centrally in the hatch and is kept in a deepening by three bridges 48. For better handling of the hatch, a handle 50 is provided in the region of the fixation pins 42.

Figure 5:
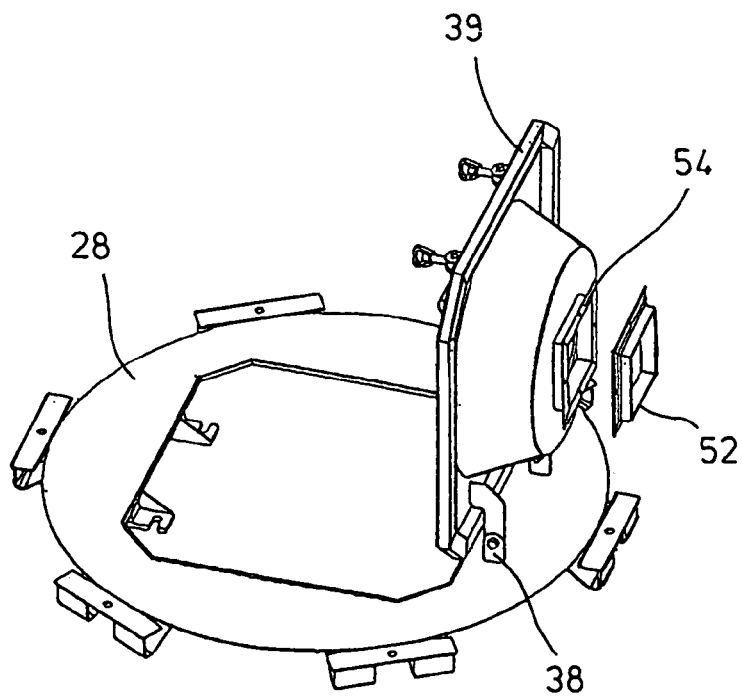
FIG. 5 shows a perspective view from the interior of the entrance hatch.

FIG. 5 shows the hatch cover 39 from the inside, a four-cornered frame 54 of the air entrance being clearly visible. On the frame 54, a filter 52 can be mounted, which additionally prevents the entrance of dirt particles and water.

Figure 6:
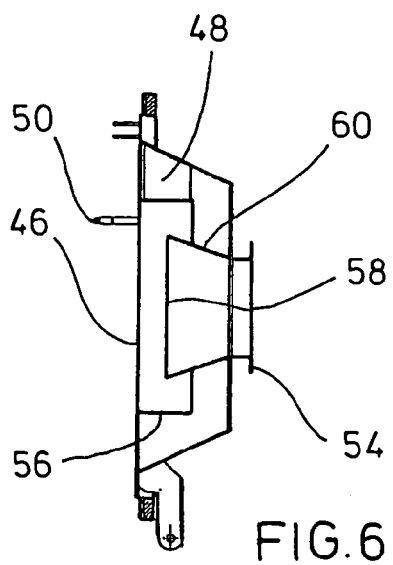
FIG. 6 shows the cross section through the entrance hatch with aeration opening.

FIG. 6 shows a cross-section, in which it can be clearly recognised that the side walls 56 of the mounted cup element 46 project over the entrance opening 58 of the connection piece 60.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A wind energy plant with an aeration equipment for a rotor hub, the aeration equipment comprising a cup-shaped element which has a bottom and a circumferential side wall,
   said aeration equipment further comprises a pipe-shaped connection piece directed into an inner space of the rotor hub, the cup shaped element being kept in front of an entrance opening of the connection piece such that the entrance opening is arranged in the interior of the cup-shaped element,
   said wall has a deepening with a central opening onto which the connection piece is set up or through which the connection piece extends through,
   wherein the cup-shaped element is held in the deepening.

2. A wind energy plant with an aeration equipment for a rotor hub, the aerationequipment comprising a cup-shaped element has a bottom and a circumferential side wall,
   said aerationequipment further comprises a pipe-shaped connection piece directed into an inner space of the rotor hub, the cup shaped element being kept in front of an entrance opening of the connection piece such that the entrance opening is arranged in the interior of the cup-shaped element,
   side wall has a deepening with a central opening onto which the connection piece is set up or through which the connection piece extends through,
   wherein the deepening is arranged and fromed such that water flow off via walls of the deepening.

3. A wind energy plant with an aeration equipment for a rotor hub, the aeration equipment comprising a cup-shaped element which has a bottom and a circumferential side wall,
   said aeration equipment further comprises a pipe-shaped connection piece directed into an inner space of the rotor hub, the cup shaped element being kept in front of an entrance opening of the connection piece such that the entrance opening is arranged in the interior of the cup-shaped element,
   said wall has a deepening with a central opening onto which the connection piece is set up or through which the connection piece extends through, wherein a surface through which the air flow is essentially of equal size between the wall of the deepening and the cup-shaped element, between the wall element and the cup-shape element, between the cup-shaped element and the connection piece, as well as the connection piece at its respective narrowest position.

4. A wind energy plant with an aeration equipment for a rotor hub, the aeration equipment comprising a cup-shaped element which has a bottom and a circumferential side wall,
   said aeration equipment further comprises a pipe-shaped connection piece directed into an inner space of the rotor hub, the cup shaped element being kept in front of an entrance opening of the connection piece such that the entrance opening is arranged in the interior of the cup-shaped element,
   said wall has a deepening with a central opening onto which the connection piece is set up or through which the connection piece extends through,
   wherein the wall element is attached to a swingably mounted frame via arms.

5. The wind energy plant according to claim 4, characterized in that the frame and/or the wall element is provided with fixation means, in order to close a central hatch opening.

6. A wind energy plant with an aeration equipment for a rotor hub, the aeration equipment copmprising a cup-shaped element which has a bottom and a circumferential side wall,
   said aeration equipment further comprises a pipe-shaped connection piece directed into an inner space of the rotor hub, the cup shaped element being kept in front of an entrance opening of the connection piece such that the entrance opening is arranged in the interior of the cup-shaped element,
   said wall has a deepening with a central opening onto which the connection piece is set up or through which the connection piece extends through, wherein the edge of the wall element is bent off along at least one circumferential line and the connection piece extends into the inner space of the rotor hub, and the one several elastic tubes are mounted on the end of the connection piece.

7. A wind energy plant with an aeration equipment for a rotor hub, the aeration equipment comprising a cup-shaped element which has a bottom and a circumferential side wall,
   said aeration equipment further comprises a pipe-shaped connection piece directed into an inner space of the rotor hub, the cup shaped element being kept in front of an entrance opening of the connection piece such that the entrance opening is arranged in the interior of the cup-shaped element,
   said wall has a deepening with a central opening onto which the connection piece is set up or through which the connection piece extends through, wherein the edge of the wall element is bent off along at least one circumferential line and on its edge portion, the wall element is kept spaced apart from a casing of the rotor hub, such that an outlet channel is formed between wall element and casing.

* * * * *